May 10, 1938.  P. F. LITTLE  2,116,524
LIGHT RAY DEFLECTOR
Filed Oct. 30, 1935   5 Sheets-Sheet 1
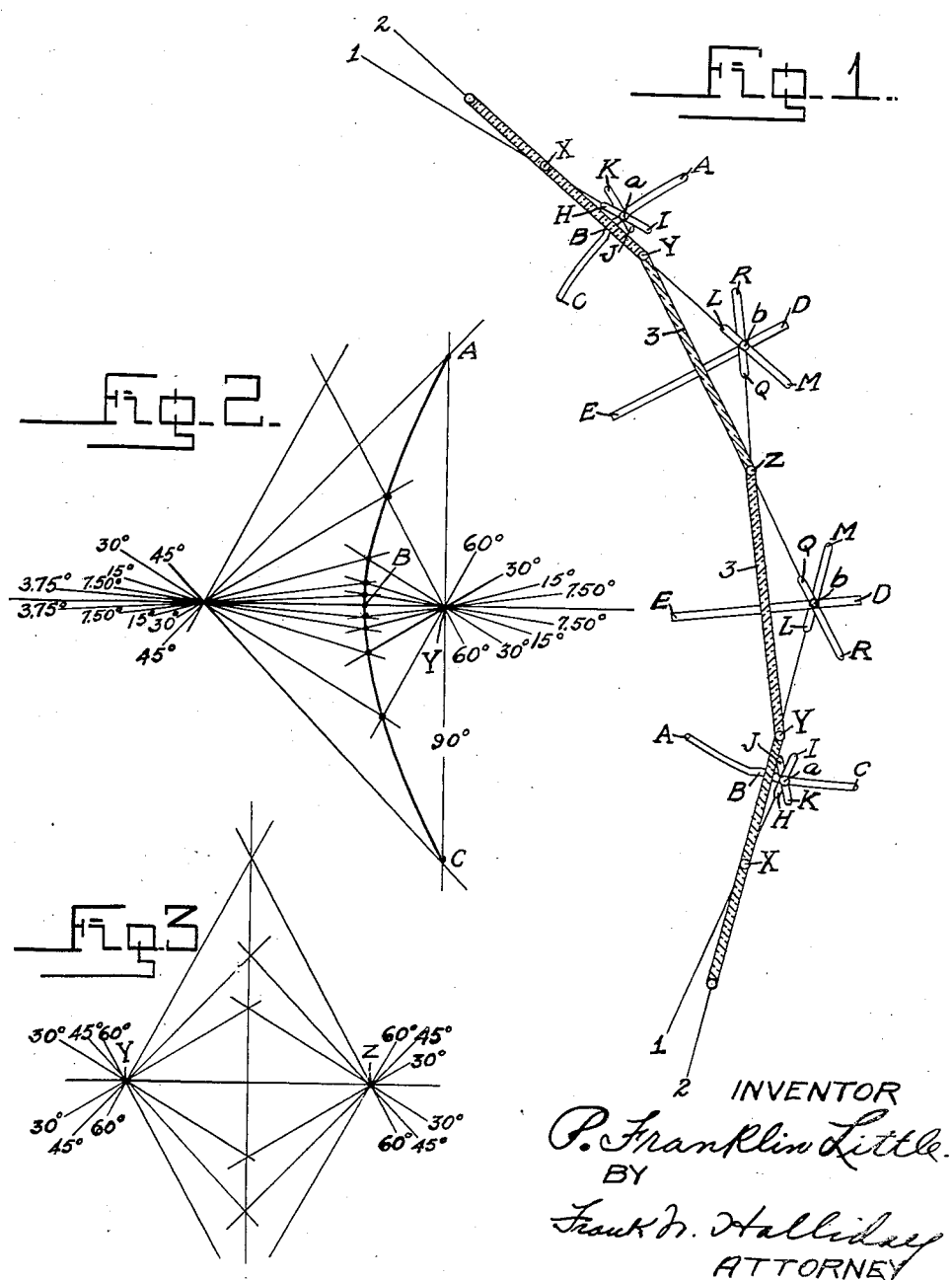
INVENTOR
P. Franklin Little.
BY
Frank M. Halliday
ATTORNEY

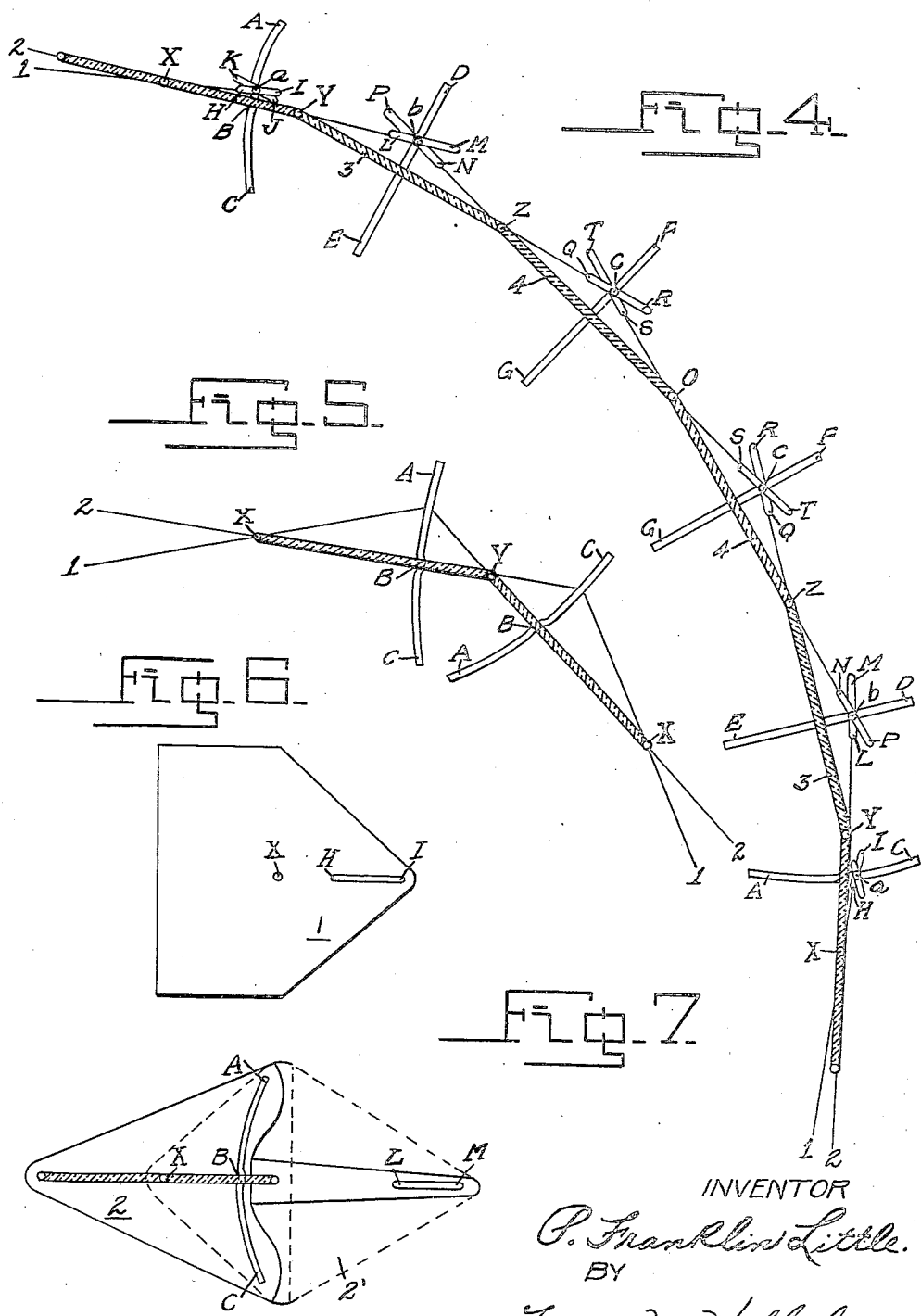

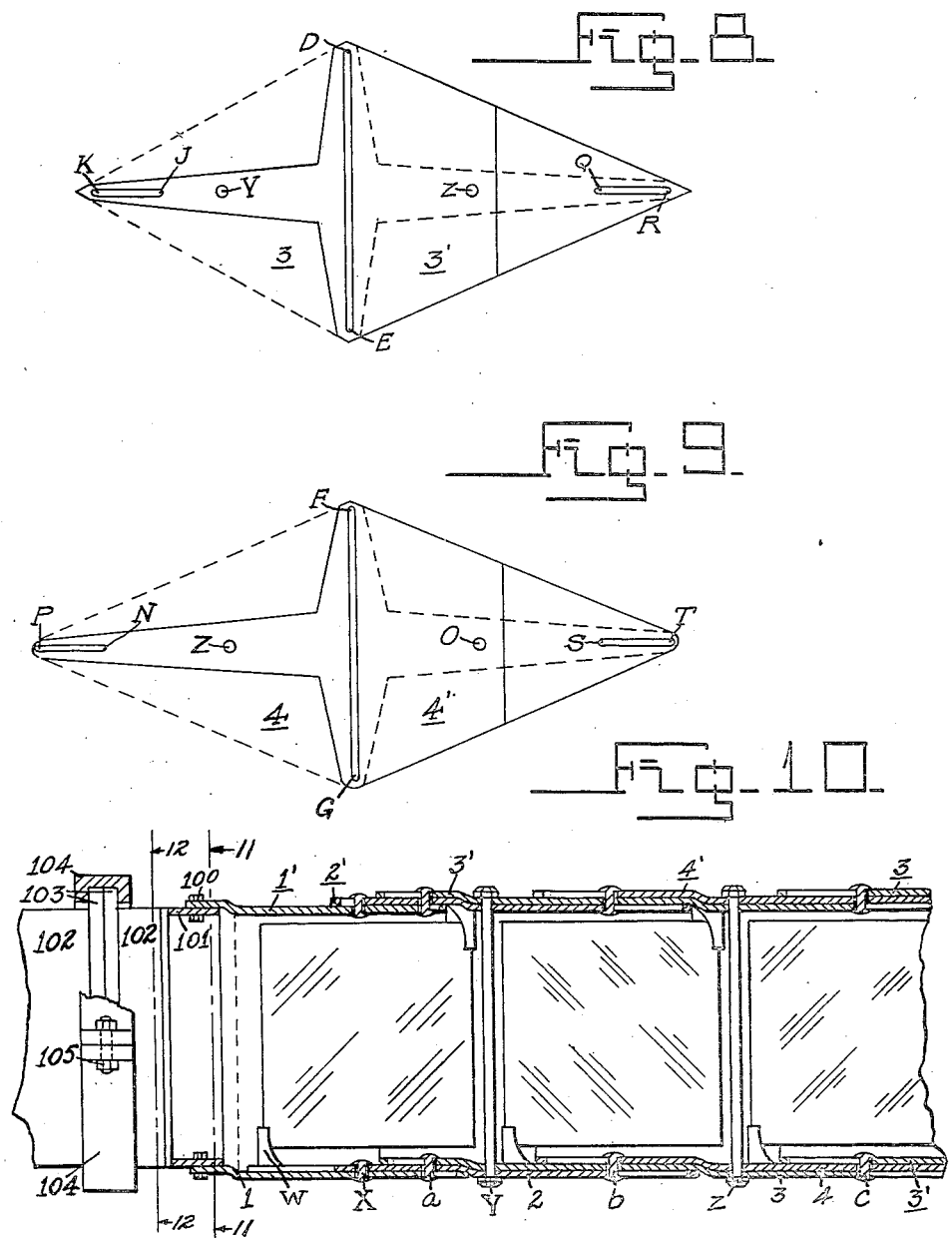

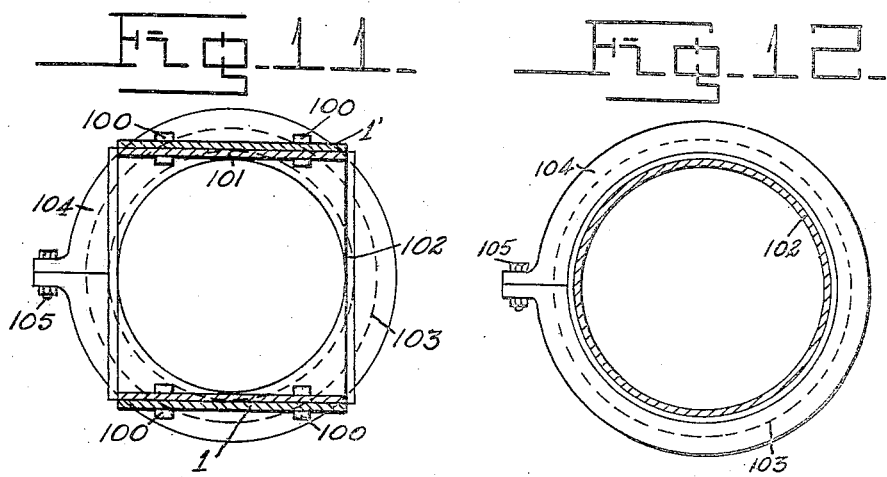
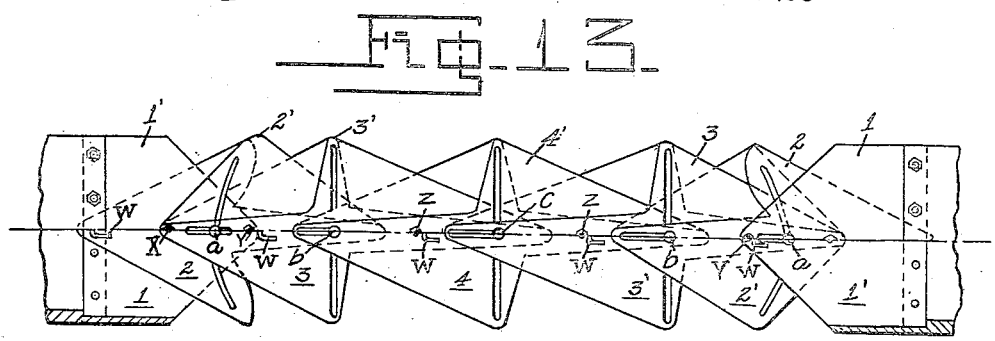
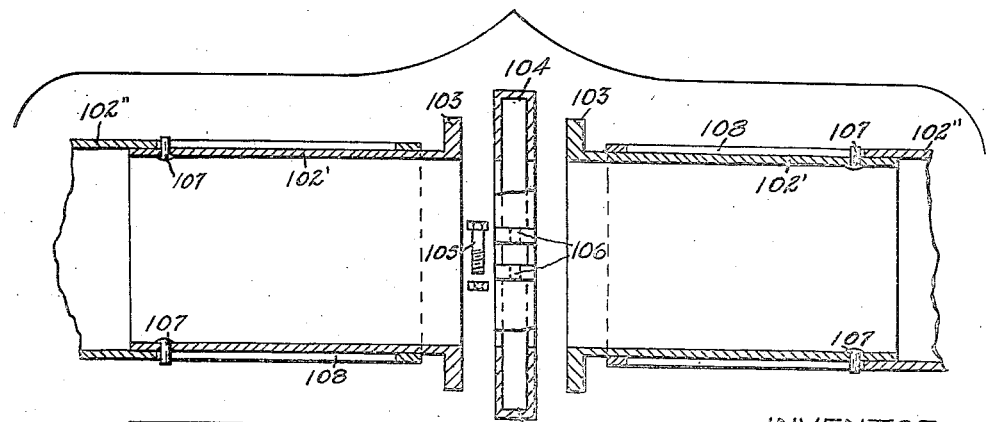

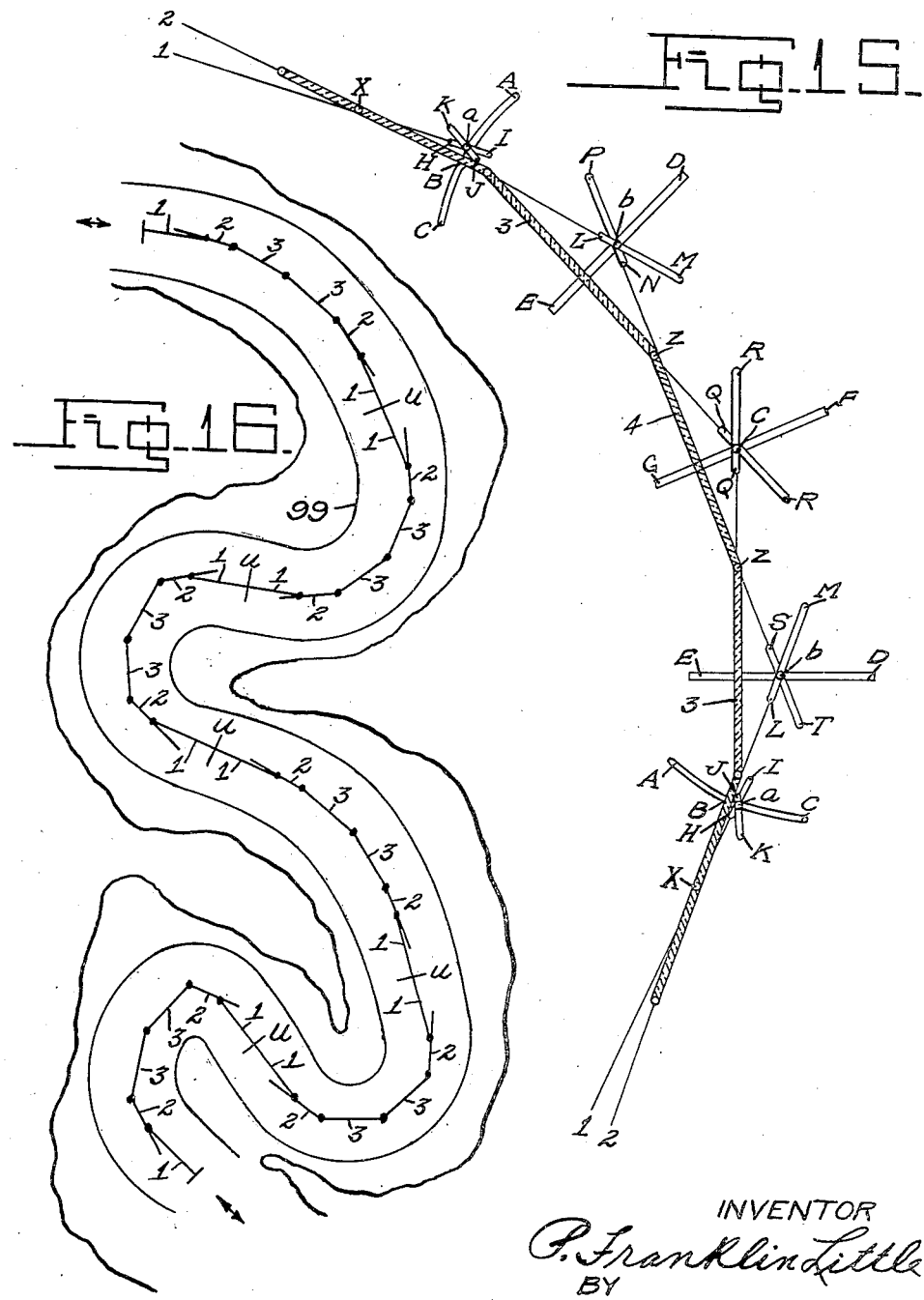

Patented May 10, 1938

2,116,524

UNITED STATES PATENT OFFICE 2,116,524

LIGHT RAY DEFLECTOR

Percival Franklin Little, Lyon Park, Va.

Application October 30, 1935, Serial No. 47,346

3 Claims. (Cl. 88—84)

(Granted under the act of March 3, 1883, as amended April 30, 1928; 370 O. G. 757)

This invention described herein may be manufactured and used by or for the Government for governmental purposes, without the payment to me of any royalty thereon.

The device hereinafter described deals with a combination of mirrors hinged end to end in sets and held always in such relation as to allow rays of light to follow a path striking each mirror in order, and finally emerging at the other end of the sets irrespective of how the sets of mirrors may be turned relative to each other. The number of mirrors in one set may be reduced to one only.

The object is to provide an observation device with the aid of which one may see around obstacles or curved paths by merely looking in one end of the device and pointing the other end in the desired direction around the obstacle to direct rays of light from a source to be observed.

Another object is to provide a flexible sight tube which may be inserted in otherwise inaccessible passages to enable one to see through a crooked path of any shape whatever, or send light rays therethrough. Furthermore, by selection of an even or odd number of mirrors, a normal or a reverse view respectively of the object may be obtained.

Some of the applications to which this device may be applied are—physician's and surgeon's flexible inspection tubes for inspection of various parts of the human body which may otherwise be inaccessible to view, or difficult to observe. These tubes may be provided with electric lighting means at their extremities. Beneficial light rays may also be directed to inaccessible affected parts.

Also they may be adapted to use on vehicles and airplanes for obtaining rear views or views around obstructing framework.

They may also be adapted for inter-office communication in connection with telephone communication to aid one party in showing the other certain documents obviating the necessity of reading them, or for executives to watch various points of a factory, office, etc.

Furthermore, they are adapted for military and naval purposes of various kinds such as trench warfare and inspecting sunken objects at the bottom of the sea or viewing various outposts from selected and hidden points. Where several guards are necessary to watch different points, one may be sufficient for watching all these points with the aid of these devices.

Various other applications without number might be added, the field of use being unlimited.

Each device may be made to flex in a plane in both directions from a straight line or only in one direction therefrom. In the latter case, the width of the device may be reduced by approximately 50%.

The method by which the rays of light are enabled to travel through the device comprises maintaining equal the respective angles of flexure between each two consecutive mirrors, the mirrors being of equal lengths, and keeping the angles between the end mirrors and end sections equal to one-half of the angle supplemental to the angle between the planes of the consecutive mirrors.

In the illustrated embodiment characterizing my device:

Fig. 1 is a diagrammatic view of a system of mirrors;

Fig. 2 is an outline showing the manner in which cross-slots for end mirror plates for supporting the mirrors are developed;

Fig. 3 is another outline showing the manner in which cross-slots of other mirror plates are developed to cooperate with the end slots in adjacent section plates to maintain the respective angles between adjacent mirrors equal throughout a set;

Fig. 4 is a diagrammatic view of a system consisting of six mirrors;

Fig. 5 is a similar view showing only two mirrors;

Fig. 6 is a plan or face view of an end section plate;

Fig. 7 is a similar view of one of a pair of end mirror plates in full lines and the other in dotted lines;

Fig. 8 is a face view of another mirror plate;

Fig. 9 is a similar view of still another form of mirror plate used in a set;

Fig. 10 is a fragmentary assembly view of a system of mirrors, parts being shown in section;

Fig. 11 is a sectional view taken on the line 11—11 in Fig. 10;

Fig. 12 is a sectional view taken on the line 12—12 in Fig. 10;

Fig. 13 is a plan view of an assembly system of mirror supporting plates;

Fig. 14 is a fragmentary sectional view of a telescopic adapter;

Fig. 15 is a diagrammatic view illustrating a system consisting of an odd number of mirrors; and Fig. 16 shows diagrammatically a series of sets of mirrors, for sending light rays through a crooked path.

Referring more specifically to the drawings, 1 indicates the relative position of end section plates used in carrying out my invention; 2 indicates the relative position of end mirror plates; 3 the mirror plates adjacent thereto or in other words the second mirror plates, and 4 the third mirror plates.

Referring to Figs. 1, 4, 5 and 15 of the drawings the plates above mentioned are provided with cooperating slots, comprising cross-slots and axial slots, the cross-slots in the end mirror plates being indicated by A B C, in the second mirror plates by D E, and in the third mirror plates by F G, whereas the axial slots in the end section plates are indicated by H I, in the end mirror plates by L M, in the second mirror plates by J K and Q R, and in the third plates by N P and S T. The three slots in each set that are pinned together are restricted to cross at a common point by pins $a$, $b$ and $c$. The hinges are indicated at X, Y, Z and O, the mirrors extending between the hinges X—Y, Y—Z, Z—O, etc., except that the end mirrors may extend beyond the hinge X where the latter is spaced midway of the mirror.

If it is desired to have the device flexible only to one side of its longitudinal axis, it is only necessary to use cross-slots extending to one side of the axis, thus reducing the width of the device to only one-half that required in a device which is flexible to both sides of the axis.

The number of mirrors may be reduced to one, the cross-slot in the mirror plate in this case being made straight, midway between the ends of the mirror, the hinges being located at these ends, so as to maintain the angles between the mirror and the end plates equal. In this case, there are no end mirror plates with curved cross-slots but merely the end plates without mirrors.

The end plates may be hinged at the ends of the end mirrors in a set as shown in Fig. 5.

The mirrors are held perpendicular to the pairs of plates by brackets $w$ attached to the plates as shown in Fig. 10.

In Fig. 7, the numeral 2 designates the lower one of the pair of end mirror plates shown in Fig. 10, the numeral 2' bounded by the diamond shaped dotted outline designates the upper plate of the pair.

Fig. 8 similarly shows the second mirror plates, the lower one of the pair in dotted outline designated 3 and the upper in full outline designated 3', the slots being alike in each of the pair.

In the same manner in Fig. 9, 4 designates the lower of the third pair of mirror plates and 4' the upper. As many of these symmetrical pairs of plates as may be desired may be inserted beyond the second pair of mirror plates, followed by a pair of second mirror plates, a pair of end mirror plates and a pair of end plates at the other end; these last three pairs being reversed as to upper and lower from the first end.

For the purpose of connecting sets of mirrors together a rotatable coupling of the type shown in Fig. 10 may be used to allow alignment of the two adjacent pairs of end plates without restricting relative rotation between them. A diagram of an assembly of this type is shown by way of example in Fig. 16 to show how a series of sets may be used together and passed through practically any form of irregular channel and illustrates how the light rays may be sent therethrough in this manner. In this figure the rotatable connections are designated $u$.

The sets as previously noted, may all consist merely of one pair of mirror plates and two pairs of end plates, thus making a more flexible series. The rotatable coupling may be formed with an adaptor fitting as shown in Figs. 10, 11 and 12. These adaptors may be of any desirable length. The series may be made up of any number of mixed sets of various numbers of mirrors for any particular purpose.

Combinations of these sets may be used by placing them at various points in space between which rays of light may be desired to be sent by merely pointing the end of each in a direction to line up with the end of the next consecutive set in the combination.

The adaptors may be made of telescopic parts to render their lengths adjustable so that they may make the series more adaptable to various uses, as e. g. in a periscope which may be adjustable in length as well as having directionally adjustable ends.

For the purpose of preventing friction between the overlapping surfaces of the plates, thin washers may be used on the hinges and pins as spacers between the plates.

The relation of the mirrors and end plates is indicated by the connected lines. It is to be understood that the irregular path may not be all in the same plane. The rotatable joints between the sets allow the assembly to follow the irregular path no matter what its shape in space may be, provided the sets are suitably proportioned as to size and number of mirrors in each set.

The hinges $x$ are preferably placed near the middle portions of the end plates for directing rays of light at all angles of flexure between the end sections and adjacent pairs of plates. The cross-sections of these rays will be as high as the mirrors and will be wider as the angle of flexure is increased.

To insure a proper relation to be maintained in a set of mirror and end plates, i. e., to keep the angles between the consecutive mirrors equal and the angle between the end mirror plates and the end plates always at one half of the angle supplemental to the angle between consecutive mirrors, a series of axial and cross slots is arranged in the plates as indicated, with a pin, $a$, $b$, $c$, etc. passing through each cross-slot and two axial slots cut in the two adjacent plates respectively. The cross-slots in all the mirror plates except the end mirror plates are straight and are in the middle thereof and at right angles to the longitudinal axes of the respective plates. The reason for this is because that is the locus of points of intersection of the axes of the adjacent plates when the latter are turned to equal angles with the axis of the plate between them. Fig. 3 shows the development of this locus, Y Z being the axis between the hinges of the middle plate. Thus it may readily be seen that by means of the pin keeping the intersection of these three slots at a common point, the outer plates are restricted to turning at equal angles with respect to the plate between them, and by carrying forward this system of connections any number of plates may be linked together and the flexure of any two consecutive plates to any angle between them may be made to determine the same angular relation between each other two consecutive plates throughout the series.

In order to keep the angle between the end plate and the end mirror plate at one half of the angle supplemental to the angle between the mirror plates using an axial slot in the end plate and one in the second mirror plate, it is necessary to use a somewhat curved cross-slot A B C in the end mirror plate, the development of which may be readily determined as is done in Fig. 2 by finding the locus of all points of intersection of the axes of the end plate and the second mirror plate respectively, when the angle between the former and the end mirror plate is maintained at one-half of the angle supplemental to the angle between the two mirror plates. This Fig. 2 is on a scale double that shown in Fig. 1 in order to make a clearer showing. In practice, it should be made to the same scale in order to get the proper shape of slot.

The outline of the plates is not important as long as the slots are properly arranged as shown. One end of each plate is preferably made narrow in order to facilitate offsetting the plates as shown in Fig. 10 without restricting their turning movement. This offsetting is necessary if the mirrors are to be properly lined up in case the consecutive plates are arranged to overlap on the same side. However, other arrangements of the plates are possible whereby the offsetting is not necessary. The mirror brackets in such cases may be attached to collars around the hinge pins.

It will also readily be seen that the angle through which the end plates in any set may be swung even in the case of a single mirror in the set, may be close to 180 degrees with respect to each other in either direction from a straight aligned position, provided the slots are made long enough. In the case of two or more mirrors this angle of 180 degrees may even be exceeded.

A set or a series of sets of mirrors may be run through a flexible tube (99) to facilitate insertion of the device through an irregular passage which may otherwise be inaccessible to view and certain parts of which are desired to be seen, or through which it is desired to send certain beneficial rays to affected parts within a body.

One form of telescopic adaptor is shown disassembled in Fig. 14 showing a telescopic portion 102'—102" at each end of the rotatable coupling composed of the flanges 103 and the bearing member 104 which holds the flanges together when clamped thereover by means of the bolt 105, passed through the bolt holes 106. The longitudinal slots 108 in the sides of the tubes 102" are for the purpose of guiding the pins 107 which are fastened to the tubes 102'. Each tube 102' slides telescopically within the respective tube 102". This assembly forms a rotatable coupling means which allows angular as well as lengthwise adjustment between the two adjoining sets of mirrors. The details shown are merely illustrative of the operation of the adaptors which may be of any other suitable construction.

In Figs. 10, 11 and 12, the adapter is not telescopic, in this instance the end plates 1 and 1' are secured by bolts 100 to diametrically opposite ears 101 on adapters 102, each having a flange 103 adapted to be engaged by the bearing member 104.

It will be obvious on inspection of the drawings that the mirrors in any set are all of equal length and that the angle any ray makes with the end mirrors in order to be reflected throughout the set, is one-half of the angle supplemental to the angle between consecutive mirrors and that it strikes each consecutive mirror in a corresponding place with reference to its length. If this angle is more or less than one-half of the angle supplemental to the angle between consecutive mirrors the ray is bound to miss striking the successive mirrors sooner or later in the set, since it will strike them farther and farther from the corresponding place on each successive mirror as it travels from one mirror to the other mirror. The end sections being deflected at one-half the angle supplemental to the angle between consecutive mirrors will therefore always be in line with the rays that travel throughout the set.

The end sections are necessary in the case of combining two or more sets of mirrors into a series for flexing the combination in more than one plane. In such cases, the end sections are connected by means of a freely rotatable connection while maintaining alignment between the end sections so as to guide the rays from one set of mirrors to the other in a proper direction for their reflection thoughout all sets.

It will thus be seen that I have developed a highly novel and efficient form of light ray deflector which is well adapted for all the purposes designated. Even though I have herein described my device as comprising certain details of construction, it is nevertheless to be understood that various changes may be made therein without departing from the spirit or scope of my invention.

Having described my invention, what I claim as new and wish to secure by Letters Patent is:

1. A set of mirrors pivotally joined end to end and having end sections pivotally connected to the end mirrors, each end section comprising parallel upper and lower members pivoted to the upper and lower edges respectively of the corresponding end mirror, the pivoted connections being all parallel to each other and to the planes of the mirrors, means for automatically maintaining the angles between consecutive mirrors equal to each other and the angle between each end section and the adjacent end mirror equal to one-half of the angle supplemental to the angle between the end mirror and the adjacent mirror when said set is flexed.

2. A combination of two sets of mirrors, the mirrors in each set being hinged in series, the hinges in each set being parallel to each other and to the mirrors in said set, a pair of connectors between the sets, means for automatically maintaining when a set is flexed the same angular relation between the consecutive mirrors in the set, while maintaining the angle between the connector at the end of the set and its adjacent mirror equal to half the angle supplemental to the angle between the consecutive mirrors in the set and means for maintaining alignment of the connector at the end of each set with the connector at the end of the other set including rotatable couplings connecting the adjacent ends of the connectors.

3. A combination of two sets of mirrors, the mirrors in each set being hinged in series, the hinges in each set being parallel to each other and to the mirrors in said set, a pair of connectors between the sets, means for automatically maintaining when a set is flexed the same angular relation between the consecutive mirrors in the set, while maintaining the angle between the connector at the end of the set and its adjacent mirror equal to half the angle supplemental to the angle between the consecutive mirrors in the set, means for maintaining alignment of the connector at the end of each set with the connector at the end of the other set including adapters at the ends of the connectors having abutting annular flanges and a bearing member mounted on said abutting flanges for holding said adapters together and also for permitting relative rotation of the adapters.

P. FRANKLIN LITTLE.